(12) United States Patent
Higle (10) Patent No.: US 12,508,782 B2
(45) Date of Patent: Dec. 30, 2025

(54) FIBER COMPOSITE COMPONENT, APPARATUS AND METHOD FOR PRODUCING A FIBER COMPOSITE COMPONENT

(71) Applicant: Dr. Ing. h.c. F. Porsche Aktiengesellschaft, Stuttgart (DE)

(72) Inventor: Andreas Higle, Wendlingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 18/773,735

(22) Filed: Jul. 16, 2024

(65) Prior Publication Data

US 2024/0367392 A1     Nov. 7, 2024

Related U.S. Application Data

(63) Continuation of application No. 17/562,245, filed on Dec. 27, 2021, now abandoned.

(30) Foreign Application Priority Data

Mar. 3, 2021    (DE) ...................... 10 2021 105 040.5

(51) Int. Cl.
    *B29C 70/32*        (2006.01)
    *B29C 53/56*        (2006.01)
                 (Continued)

(52) U.S. Cl.
    CPC .............. *B29C 70/32* (2013.01); *B29C 53/56* (2013.01); *B60G 7/001* (2013.01);
                 (Continued)

(58) Field of Classification Search
    CPC ............. Y10T 74/2142; Y10T 74/2143; Y10T 74/2144
See application file for complete search history.

(56) References Cited

U.S. PATENT DOCUMENTS 4,671,336 A    6/1987   Anahara
4,757,681 A    7/1988   Matsuno
           (Continued)

FOREIGN PATENT DOCUMENTS

CN       210763666 U    6/2020
DE         8320488 U1    3/1985
           (Continued)

OTHER PUBLICATIONS

Macione Translation of PCT WO 2009/138660, Date Unknown.*
           (Continued)

*Primary Examiner* — Jeffry H Aftergut
(74) *Attorney, Agent, or Firm* — Buchanan Ingersoll & Rooney PC (57) ABSTRACT

A fiber composite component has two inner elements arranged at a distance from one another, around which inner elements a fiber-reinforced plastics band is wrapped. In order to simplify the production of the fiber composite component, a first fiber-reinforced plastics band is wrapped around a first inner element, and a second fiber-reinforced plastics band is wrapped around a second inner element. The first and the second fiber-reinforced plastics band are wrapped alternately around the first and the second inner element in such a manner that the distance between the inner elements is bridged by the first and the second fiber-reinforced plastics band.

11 Claims, 6 Drawing Sheets

(51) Int. Cl.
*B60G 7/00* (2006.01)
*B29K 63/00* (2006.01)
*B29K 307/04* (2006.01)
*B29L 31/30* (2006.01)

(52) U.S. Cl.
CPC ...... *B29K 2063/00* (2013.01); *B29K 2307/04* (2013.01); *B29L 2031/30* (2013.01); *B60G 2206/10* (2013.01); *B60G 2206/7101* (2013.01)

(56) References Cited

U.S. PATENT DOCUMENTS

| | | |
|---|---|---|
| 5,215,616 A | 6/1993 | Fillar |
| 6,116,113 A | 9/2000 | Pazdirek |
| 11,590,714 B2 | 2/2023 | Valembois |
| 2010/0047613 A1 | 2/2010 | Padden |
| 2012/0279635 A1 | 11/2012 | Masson et al. |
| 2020/0130446 A1 | 4/2020 | Stieglitz |
| 2020/0282665 A1 | 9/2020 | Gralka et al. |
| 2021/0229757 A1 | 7/2021 | Gralka et al. |
| 2023/0347598 A1 | 11/2023 | Müller |

FOREIGN PATENT DOCUMENTS

| | | | | |
|---|---|---|---|---|
| DE | 19527197 A1 | | 1/1997 | |
| DE | 102005059933 A1 | * | 6/2007 | ............. F16C 7/026 |
| DE | 202008008215 U1 | | 10/2008 | |
| DE | 102017221235 A1 | | 5/2019 | |
| DE | 102018210119 A1 | | 12/2019 | |
| WO | 0164570 A1 | | 9/2001 | |
| WO | WO-2009138660 A2 | * | 11/2009 | ............. B29C 7/030 |

OTHER PUBLICATIONS

Machine Translation of German Patent 102005059933, Date Unknown.*
English Translation of Chinese Office Action for Chinese Application No. 202210188530.8, issued Aug. 22, 2023, 8 pages.

* cited by examiner

FIBER COMPOSITE COMPONENT, APPARATUS AND METHOD FOR PRODUCING A FIBER COMPOSITE COMPONENT

CROSS-REFERENCE TO RELATED APPLICATION

This application is a continuation patent application of U.S. patent application Ser. No. 17/562,245, filed Dec. 27, 2021, which claims priority to German Patent Application No. 10 2021 105 040.5, filed Mar. 3, 2021, the content of such application being incorporated by reference herein in its entirety.

FIELD OF THE INVENTION

The invention relates to a fiber composite component having two inner elements arranged at a distance from one another, around which inner elements a fiber-reinforced plastics band is wrapped. The invention relates further to a method and an apparatus for producing such a fiber composite component.

BACKGROUND OF THE INVENTION

US 2010/0047613 A1, which is incorporated by reference herein, describes a composite brace which comprises a plurality of flat inner composite plies and two stepped inserts which are overlaid with another plurality of flat outer composite plies. DE 10 2005 059 933 A1, which is incorporated by reference herein, describes a fiber composite component, in particular a compression-tension strut, comprising: A core element which has at least one concavely constructed face; wherein a passage opening adjoins the at least one concavely constructed face of the core element; and wherein respectively opposite lateral or longitudinal sides of the core element and the side of the passage opening not bounded by the core element are enclosed in a loop-type manner by a fiber composite element, wherein the fiber composite element is a fiber composite element braided in a direction perpendicular to the lateral or longitudinal sides.

SUMMARY OF THE INVENTION

It would be desirable to simplify the production of a fiber composite component having two inner elements arranged at a distance from one another, around which inner elements a fiber-reinforced plastics band is wrapped.

Described herein is a fiber composite component having two inner elements arranged at a distance from one another, around which inner elements a fiber-reinforced plastics band is wrapped, in that a first fiber-reinforced plastics band is wrapped around a first inner element, wherein a second fiber-reinforced plastics band is wrapped around a second inner element, wherein the first and the second fiber-reinforced plastics band are wrapped alternately around the first and the second inner element in such a manner that the distance between the inner elements is bridged by the first and the second fiber-reinforced plastics band. The inner elements, which can also be referred to as inserts, are, for example, sleeves, which are formed of metal. The inner elements or inserts serve principally for force guidance in a fiber composite of the fiber composite component. The inner elements or inserts advantageously comprise a receiver, for example in the form of a through-hole, which, when the fiber composite component is used as a connecting element, in particular as a connecting rod, in the chassis of a motor vehicle, serves to receive a rubber bearing. The inner elements can have virtually any desired form. The inner elements can be of identical construction. The inner elements can, however, also be of different constructions. The inner elements can have identical or different diameters. It is essential that the inner elements have an outer contour around which a fiber-reinforced plastics band can be wrapped. For this purpose, the inner elements can be of rotationally symmetrical construction. The inner elements can, however, also have the form of, for example, a polygon, the outer faces of which are advantageously convex. The fiber-reinforced plastics band is, for example, a tape which is formed of a band-like prepreg material, in particular a CFRP prepreg material. It is also possible to wrap dry fibers around the inner elements and then, at the end of the production process, inject resin into an additional tool. The two fiber-reinforced plastics bands can be formed of the same material. If required, the two fiber-reinforced plastics bands can, however, also be formed of different materials and/or comprise different fibers. The two fiber-reinforced plastics bands are first wrapped around the two inner elements independently of one another. This has the advantage, inter alia, that a stable association between the two inner elements and the respective associated fiber-reinforced plastics bands is produced. Thereafter, the two fiber-reinforced plastics bands are then jointly wrapped alternately around the inner elements around each of which a fiber-reinforced plastics band has already been wrapped. An intermediate element can thereby be arranged between the two inner elements. Depending on the design, the intermediate element can remain in the fiber composite component. The two inner elements can, however, also be held at a defined distance relative to one another by a suitable tool during wrapping. After wrapping and curing of the prepreg material, the tool, in particular a corresponding spacer of the tool, can then be removed.

A preferred exemplary embodiment of the fiber composite component is characterized in that there is arranged between the inner elements an intermediate element around which the first and the second fiber-reinforced plastics band are wrapped alternately. The intermediate element is, for example, a pultruded profile. The two fiber-reinforced plastics bands are advantageously wrapped alternately around the intermediate element together with the two inner elements. An extremely stable association between the two inner elements with the intermediate element in the fiber composite component is thereby produced.

A further preferred exemplary embodiment of the fiber composite component is characterized in that the inner elements each have an in particular rotationally symmetrical form with an axis of rotation. The inner elements, as already described hereinbefore, may be rotationally symmetrical in form but do not have to be rotationally symmetrical in form. The axis of rotation coincides, for example, with a longitudinal axis of a through-hole in the inner element. The axis of rotation advantageously permits a defined rotation of the inner elements as the respective associated fiber-reinforced plastics band is wrapped around the inner elements. The fiber-reinforced plastics band is provided, for example, on a roll, from which the fiber-reinforced plastics band is unwound when the respective inner element is rotated about its axis of rotation. The respective associated fiber-reinforced plastics band can thus automatically be wrapped around the inner elements, advantageously in a suitable tool.

A further preferred exemplary embodiment of the fiber composite component is characterized in that the inner elements each have at least one circumferential depression, which depressions constitute axial securing means for the fiber-reinforced plastics bands. To form the circumferential depression, the inner elements, when seen in longitudinal section, can be, for example, concave in form. The inner elements, when seen in longitudinal section, can, however, also comprise an axial portion with a reduced inside diameter, which is delimited by two axial shoulders. The circumferential depression advantageously prevents axial migration of the plastics bands during wrapping.

In a method for producing a fiber composite component described hereinbefore, the first inner element is rotated about its axis of rotation in order to wrap the first fiber-reinforced plastics band around the first inner element, wherein the second inner element is rotated about its axis of rotation in order to wrap the second fiber-reinforced plastics band around the second inner element, before the first and the second inner element are jointly rotated about a third axis of rotation in order to wrap the first and the second fiber-reinforced plastics band alternately around the first and the second inner element in such a manner that the distance between the inner elements is bridged by the first and the second fiber-reinforced plastics band. Accordingly, in a simple manner, a very stable fiber composite component with two inner elements or inserts which are at a distance from one another can advantageously be produced largely in an automated manner.

A preferred exemplary embodiment of the method is characterized in that the fiber-reinforced plastics bands are deposited parallel to one another between the inner elements. By unidirectional orientation, a stable fiber composite component which withstands both high tensile and compressive loads is produced.

A further preferred exemplary embodiment of the method is characterized in that the fiber-reinforced plastics bands are deposited between the inner elements in a crossed association. Different wrapping patterns can be achieved on deposition of the fiber-reinforced plastics bands. Depending on the load that is to be expected, the fiber-reinforced plastics bands can be deposited at different angles relative to one another.

A further preferred exemplary embodiment of the method is characterized in that a fiber composite material of overlarge dimensions in the axial direction is divided, after wrapping, transversely to the axial direction into at least two fiber composite components. Advantageously, multiple fiber composite components can thus be produced in one wrapping operation. Dividing is carried out with a suitable separating tool.

In an apparatus for producing a fiber composite component described hereinbefore, a first rotary drive for the first inner element and a second rotary drive for the second inner element, wherein the two rotary drives are attached to a coupling support which is rotatable about a third axis of rotation in order to wrap the first and the second fiber-reinforced plastics band alternately around the first and the second inner element with the distance between them. The first rotary drive serves to rotate the first inner element in such a manner that the first fiber-reinforced plastics band is wrapped around it. The second rotary drive serves to rotate the second inner element in such a manner that the second fiber-reinforced plastics band is wrapped around it. The fiber-reinforced plastics bands are thereby advantageously unwound from two mutually independent rolls. After a desired number of plies of the respective associated fiber-reinforced plastics band has been wrapped around each of the two inner elements, the two inner elements are jointly rotated about the third axis of rotation. The two fiber-reinforced plastics bands are thereby unwound from both rolls and deposited alternately, in order to connect the two inner elements to one another. As soon as a desired number of plies of the two fiber-reinforced plastics bands has been deposited, the fiber composite component is finished and then simply has to cure.

A preferred exemplary embodiment of the apparatus is characterized in that the apparatus comprises at least one pressing roller which serves to constitute a tensioning device for the fiber-reinforced plastics bands between the inner elements. On the one hand, a looping angle between the fiber-reinforced plastics bands and the inner elements can thus be increased. In addition, it can be ensured that the fiber-reinforced plastics bands, during wrapping, are in contact with an optional intermediate element between the inner elements. Also described herein is a motor vehicle having a fiber composite component described hereinbefore. The fiber composite component is, for example, a connecting rod or a coupling element which is installed in a chassis of the motor vehicle.

BRIEF DESCRIPTION OF THE DRAWINGS

Further advantages, features and details of the invention will become apparent from the following description, in which various exemplary embodiments are described in detail with reference to the drawing. In the drawing.

DETAILED DESCRIPTION OF THE INVENTION

FIGS. 1 to 4 show four different exemplary embodiments, in each case in perspective, of a fiber composite component 10. The fiber composite component 10 comprises a first inner element 1 and a second inner element 2. The two inner elements 1, 2 are also referred to as inserts. The inner elements or inserts 1, 2 are in the form of sleeves 3, 4, for example.

Figure 2:
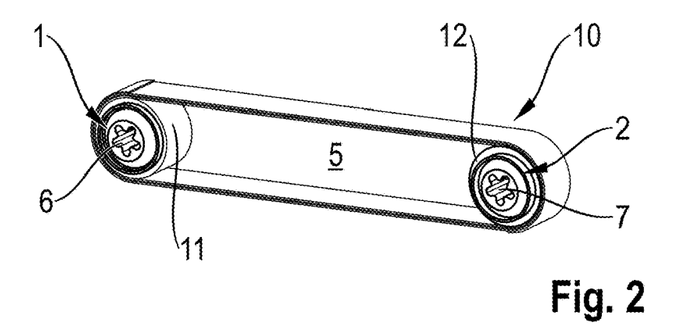
Figure 4:
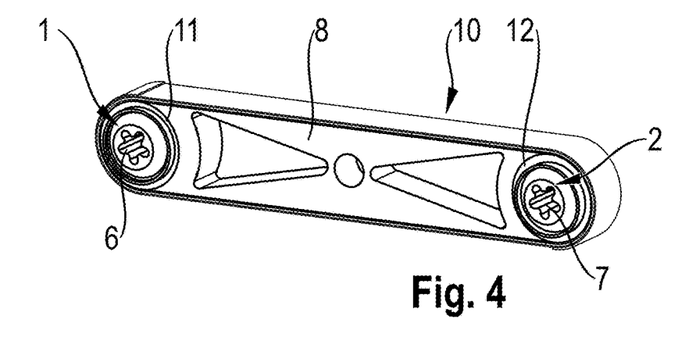

The sleeves 3, 4 are formed of metal and serve, as is shown in FIGS. 2 and 4, to receive rubber bearings 6, 7. The inner elements 1, 2 with the rubber bearings 6, 7 serve, for example, for fastening the fiber composite part 10 to different locations of a motor vehicle.

The fiber composite component 10 is, for example, a coupling element or a connecting rod for mounting in a chassis of a motor vehicle. The fiber composite component 10 is fastened by the first inner element 1, for example with the aid of a fastening means, such as a screw, to a wheel carrier of the motor vehicle. The fiber composite component 10 is then fastened by the second inner element 2, advantageously likewise using a suitable fastening means, such as a screw, to a body of the motor vehicle.

Figure 1:
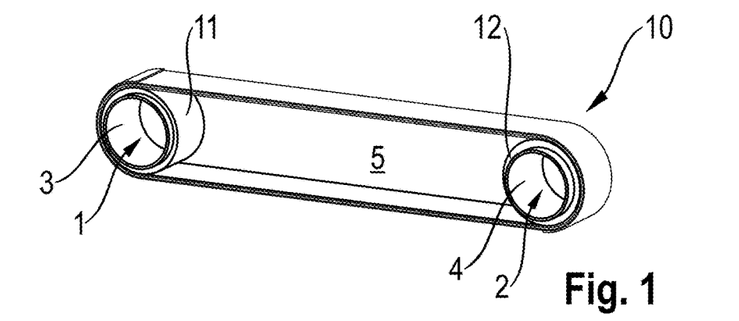
FIGS. 1-4 show, in each case in a perspective illustration, exemplary embodiments of a fiber composite component having two inner elements arranged at a distance from one another, around which inner elements fiber-reinforced plastics bands are wrapped.
Figure 3:
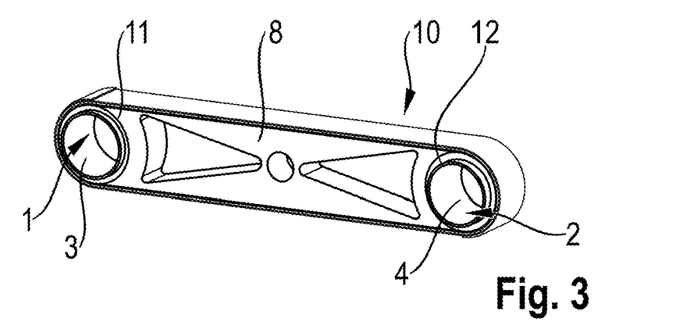

The two inner elements 1, 2 are arranged at a defined distance from one another. In FIGS. 1 and 2, an intermediate space 5 between the two inner elements 1, 2 is empty. In FIGS. 3 and 4, an intermediate element 8 is arranged between the two inner elements 1, 2.

Multiple plies of a first fiber-reinforced plastics band 11 are wrapped around the first inner element 1. Multiple plies of a second fiber-reinforced plastics band 12 are wrapped around the second inner element 2. Both the first fiber-reinforced plastics band 11 and the second fiber-reinforced plastics band 12 are additionally wrapped around the two inner elements 1, 2 and the intermediate space 5, or the intermediate element 8.

According to an essential aspect of the invention, first only the respective associated fiber-reinforced plastics band 11, 12 is wrapped around the two inner elements 1, 2. The two fiber-reinforced plastics bands 11, 12 are then jointly wrapped alternately around the inner elements 1, 2 so wrapped.

The fiber-reinforced plastics bands 11, 12 are preferably tapes of a prepreg material. In a preferred exemplary embodiment, the plastics bands 11, 12 are reinforced with carbon fibers. The corresponding prepreg material is referred to as CFRP prepreg material.

The fiber-reinforced plastics bands or tapes 11, 12 are, for example, strips of unidirectional fibers, in particular carbon fibers, which are pre-impregnated with a matrix, in particular an epoxy resin. The bands or strips so pre-impregnated are wrapped around the inner elements 1, 2.

After wrapping, the wrapped component is preferably subjected to heat treatment in order that the matrix material, in particular the epoxy resin, with the fibers embedded therein cures. After curing, the fiber-reinforced plastics bands 11, 12 are solid and establish a stable connection between the inner elements 1, 2.

The intermediate space 5 between the inner elements 1 and 2 can remain free, as can be seen in FIGS. 1 and 2. However, the intermediate part or intermediate element 8 can also remain arranged in the intermediate space 5 between the inner elements 1, 2, as can be seen in FIGS. 3, 4. The intermediate element, intermediate part or middle part 8 is, for example, a pultruded profile.

Figure 5:
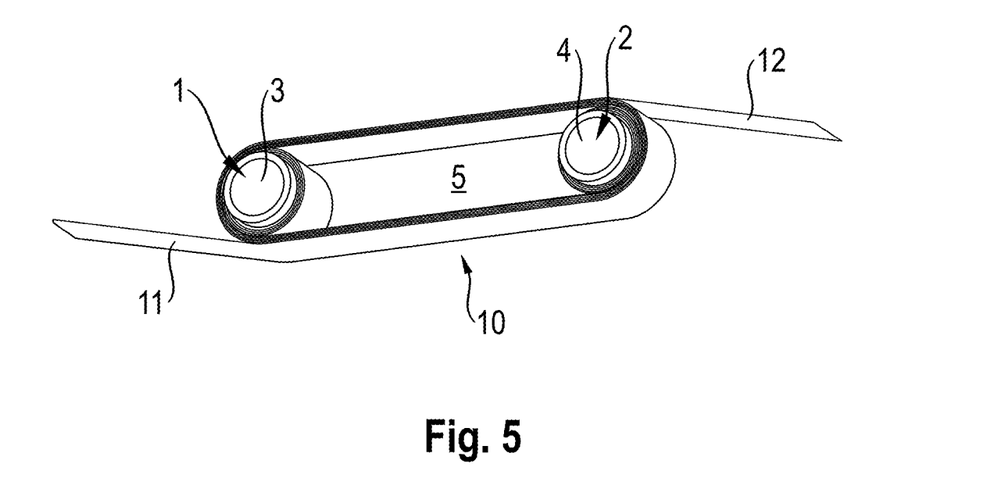
FIGS. 5 and 6 show, in different views, the fiber composite component of FIG. 1 at the end of a wrapping process.
Figure 6:
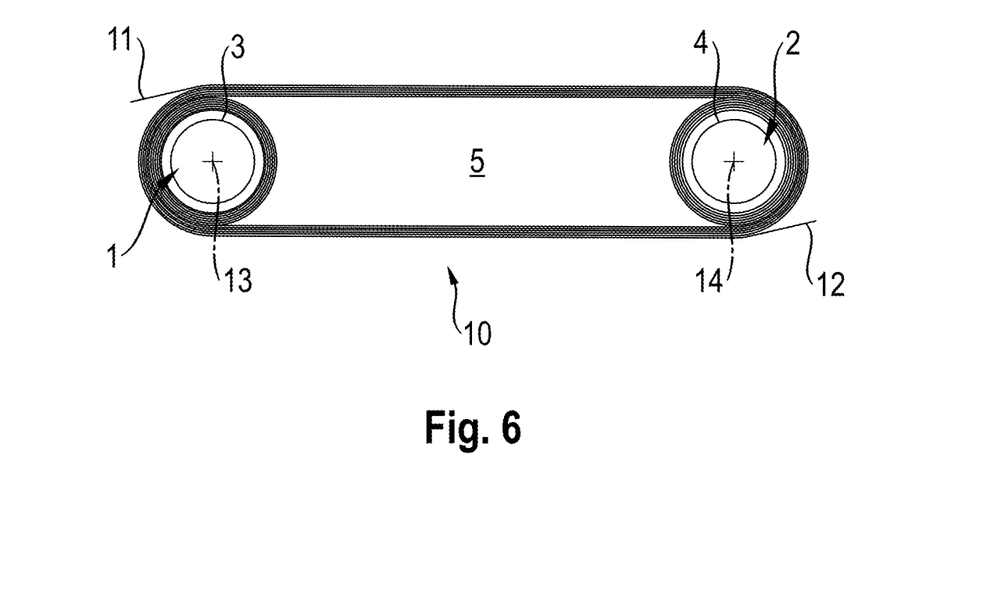

In FIGS. 5 and 6, the fiber composite component 10 from FIG. 1 is shown at the end of the wrapping operation. At the top in FIGS. 5 and 6, a ply of the second fiber-reinforced plastics band 12 has been deposited last. At the bottom in FIGS. 5 and 6, a ply of the first fiber-reinforced plastics band 11 has been deposited last. In FIG. 6, a first axis of rotation 13 for the first inner element 1 and a second axis of rotation 14 for the second inner element 2 are shown.

Figure 7:
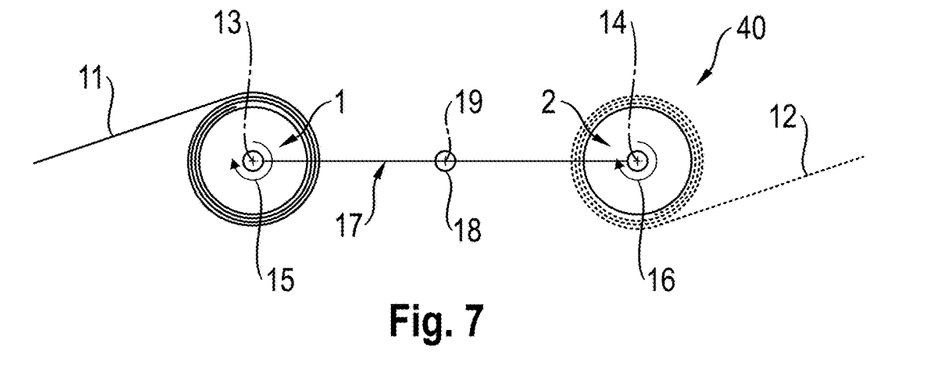
FIG. 7 is a schematic illustration of an apparatus for producing the fiber composite component at the start of a wrapping operation.

FIG. 7 shows, schematically, an apparatus 40 which can advantageously be used to produce the fiber composite component. The apparatus 40 comprises a coupling support 17, to which two inner elements 1, 2 are rotatably attached. In its center, the coupling support 17 comprises a rotary drive 18. By means of the rotary drive 18, the coupling support 17, with the inner elements 1, 2 rotatably attached thereto, is rotatable about a third axis of rotation 19.

An arrow 15 in FIG. 7 shows how the first fiber-reinforced plastics band 11 is wrapped around the first inner element 1. An arrow 16 shows how the second fiber-reinforced plastics band 12 is wrapped in multiple plies around the second inner element 2. By wrapping the two fiber-reinforced plastics bands 11, 12 around the inner elements 1, 2, a stable connection at the inner elements 1, 2 is ensured.

As soon as sufficient plies of the fiber-reinforced plastics bands 11, 12 have been wrapped around the inner elements 1 and 2, the coupling support 17 with the inner elements 1, 2 with the bands already wrapped around them can, in a second stage of the wrapping operation, be rotated by means of the third rotary drive 18 about the third axis of rotation 19 in order to establish a connection between the already pre-wrapped inner elements 1, 2. The progress of the wrapping process is illustrated in FIGS. 14 to 16.

Figure 8:
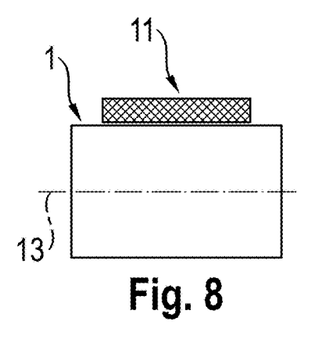
FIGS. 8-10 each show, in longitudinal section, an inner element of the fiber composite component according to different embodiment variants.
Figure 9:
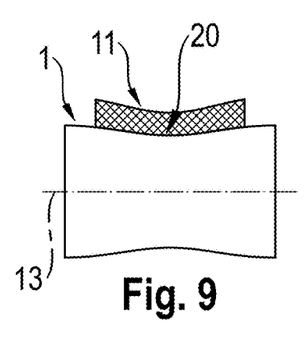
Figure 10:
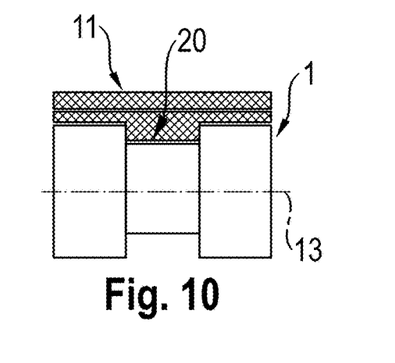

FIGS. 8 to 10 illustrate embodiment variants of the inner element 1 in each case in longitudinal section. The inner element 1 in FIG. 8 has the form of a straight circular cylinder. In FIGS. 9 and 10 it is shown that the inner element 1 can be equipped with a circumferential depression 20. Centering of the fiber-reinforced plastics band 11 as it is wrapped around the inner element 1 is thereby made possible. Furthermore, undesirable lateral migration of the fiber-reinforced plastics band 11 during wrapping is prevented.

Figure 11:
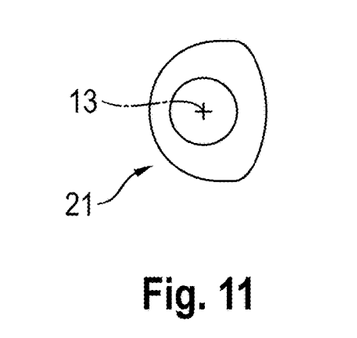
FIGS. 11 and 12 show, in each case in a plan view, further embodiment variants of inner elements.
Figure 12:
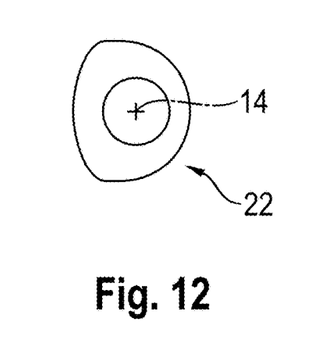

FIGS. 11 and 12 show inner elements 21, 22 which are not rotationally symmetrical. It is essential only that the inner elements 21, 22 are able to be wrapped. In addition, it is advantageous if the inner elements 21, 22 are rotatable about an axis of rotation 13, 14. Sharp edges can advantageously be mitigated by rounding or convex shaping.

Figure 13:
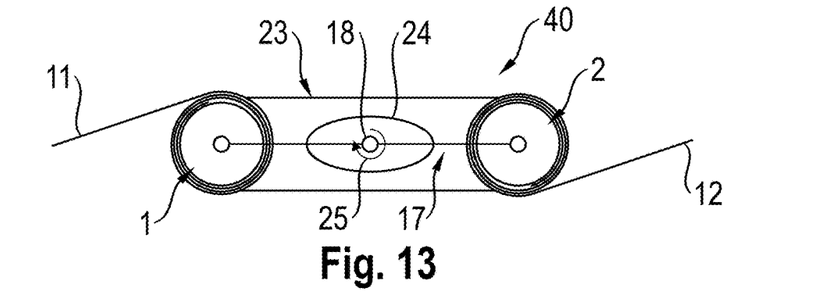
FIGS. 13-19 show different forms of the apparatus for producing the fiber composite component, in each case in a schematic illustration and in different states, in order to illustrate a method for producing the fiber composite component.
Figure 14:
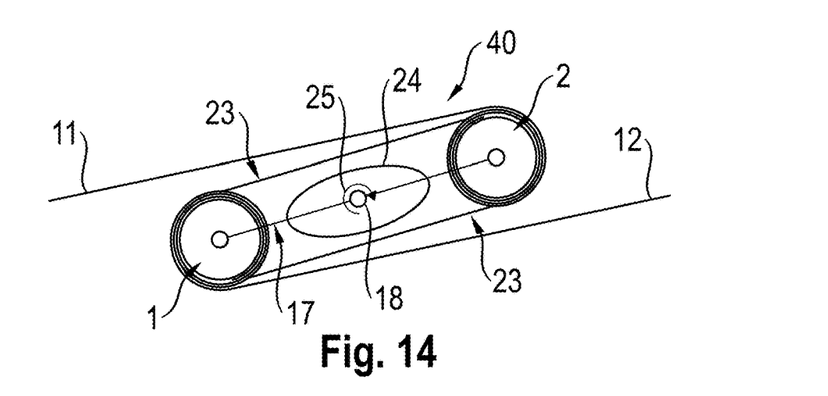
Figure 15:
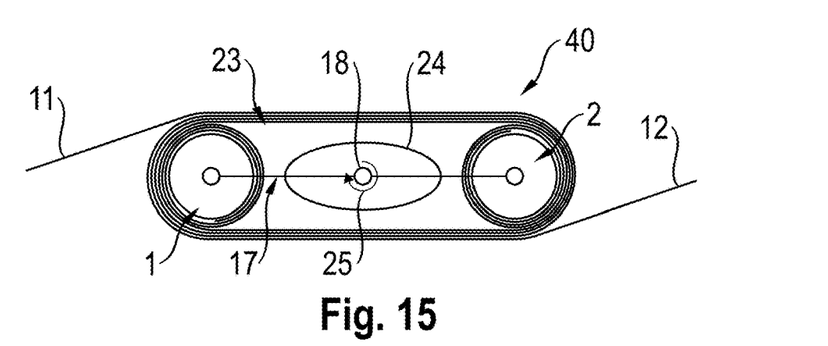
Figure 16:
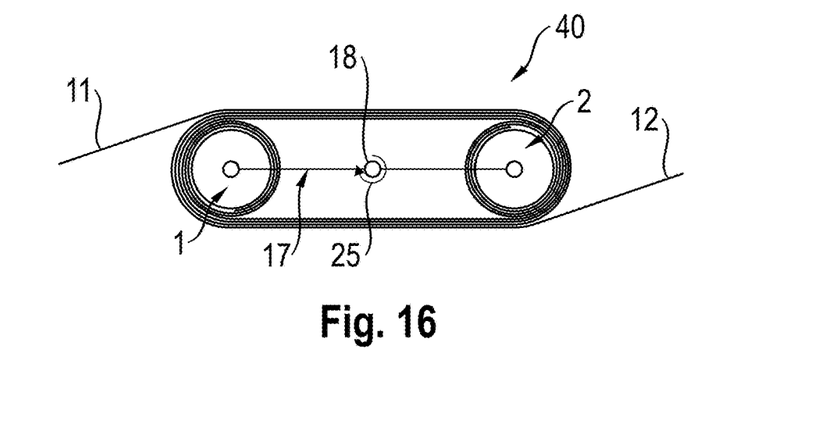

FIGS. 13 to 15 show the apparatus 40 in different method steps during production of the fiber composite component. Unlike in FIG. 7, an intermediate element 23 is arranged between the inner elements 1 and 2. It will be seen in FIG. 13 that the respective associated fiber-reinforced plastics tape 11, 12 has first been wrapped around the inner elements 1 and 2 independently of one another.

An arrow 25 in each of FIGS. 14 and 15 shows how the two fiber-reinforced plastics bands 11, 12 are wrapped around the intermediate product from FIG. 13 in a second wrapping stage. By means of a suitable rotating apparatus 24, the coupling support 17 with the two inner elements 1, 2 is rotated clockwise about the third axis of rotation 19. Plies of the fiber-reinforced plastics bands 11, 12 are thereby deposited alternately.

The intermediate element 23 advantageously serves to provide pressure support for the inner elements 1, 2 during wrapping. In addition, the intermediate element 23 performs the function of a gusset in the transition region.

FIG. 16 shows that the fiber composite component can be wrapped by means of the apparatus 40 also without an intermediate element.

Figure 17:
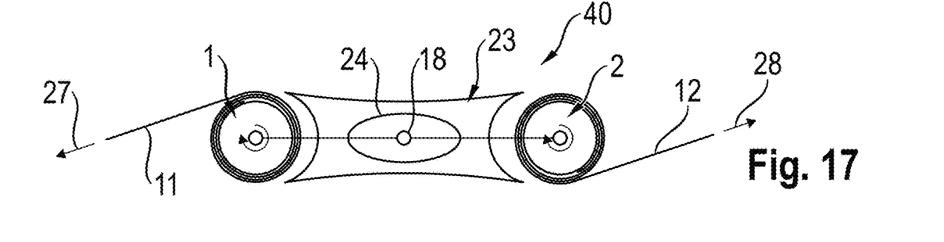
Figure 18:
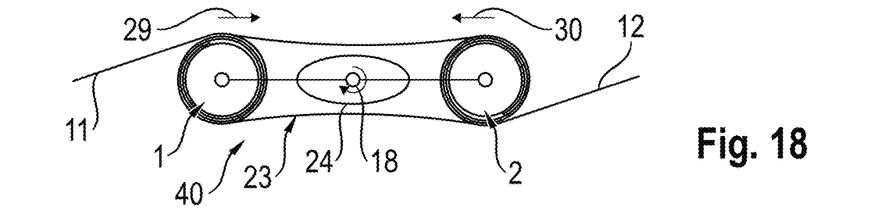
Figure 19:
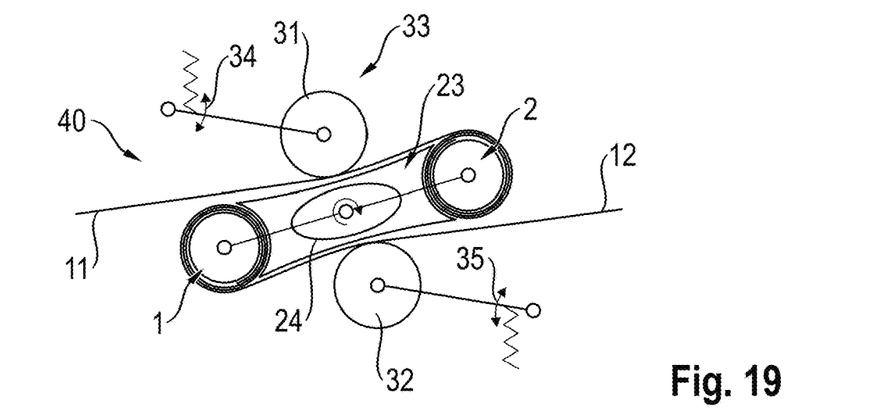

FIGS. 17 to 19 show that the intermediate element 23, unlike in FIGS. 13 to 15, can also be of waisted form. FIG. 17 shows that the inner elements 1, 2 are at a distance from the intermediate element 23 during wrapping with the fiber-reinforced plastics bands 11, 12. Arrows 27, 28 indicate forces which act on the fiber-reinforced plastics bands 11, 12 during wrapping of the inner elements 1, 2.

Arrows 29, 30 in FIG. 18 show that the inner elements 1, 2, after they have been wrapped, are moved towards the intermediate element 23 for pressure support. For this purpose, the coupling support 17 of the apparatus 40 is advantageously adjustable.

FIG. 19 shows that the apparatus 40 can also be combined with pressing rollers 31, 32. The pressing rollers 31, 32 serve to constitute a tensioning device 33. The tensioning device 33 comprises a mounting, only adumbrated, having spring devices for the pressing rollers 31, 32. Double arrows 34, 35 in FIG. 19 show that the pressing rollers 31, 32 can be moved towards one another in order to bring the fiber-reinforced plastics bands 11, 12 into contact with the intermediate element 23.

By means of the tensioning device 33 having the pressing rollers 31, 32, a desired compaction of the individual plies during wrapping with the fiber-reinforced plastics bands 11, 12 can be improved. In addition, by a combination of tension and adhesion, stable deposition on an inwardly directed or waisted contour is made possible.

FIGS. 20 to 24 show, schematically, exemplary embodiments of the apparatus 40. In FIGS. 20 to 24, the coupling support 17 of the apparatus 40 is in the form of a frame with three rotary drives 41, 42, 43. The rotary drive 41 serves to rotate the inner element 1 during wrapping with the fiber-reinforced plastics band 11. The rotary drive 42 serves to rotate the inner element 2 during wrapping with the fiber-reinforced plastics band 12.

Figure 20:
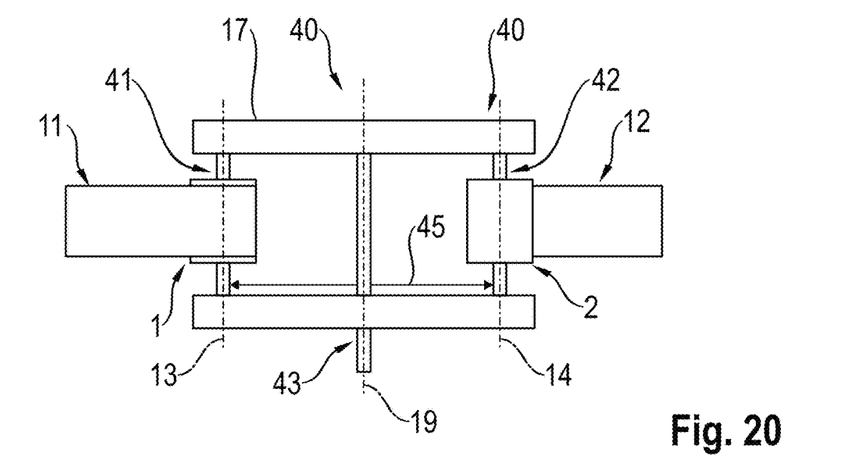
FIGS. 20-24 are schematic illustrations of embodiment variants of the apparatus for producing the fiber composite component.

The rotary drive 43 allows the coupling support 17 in the form of a frame to be rotated, together with the inner elements 1, 2, about the third axis of rotation 19. The axes of rotation 13, 14 and 19 extend parallel to one another, as can be seen in FIG. 20. The axis of rotation 19 is shown centrally between the axes of rotation 13 and 14.

A double arrow 45 in FIG. 20 shows that the coupling support 17 can be adjustable, in order to permit a desired movement of the inner elements 1, 2 towards one another and optionally also away from one another. This movement of the inner elements 1 and 2 towards one another is indicated in FIG. 18 by the arrows 29 and 30.

Figures 21, 22:
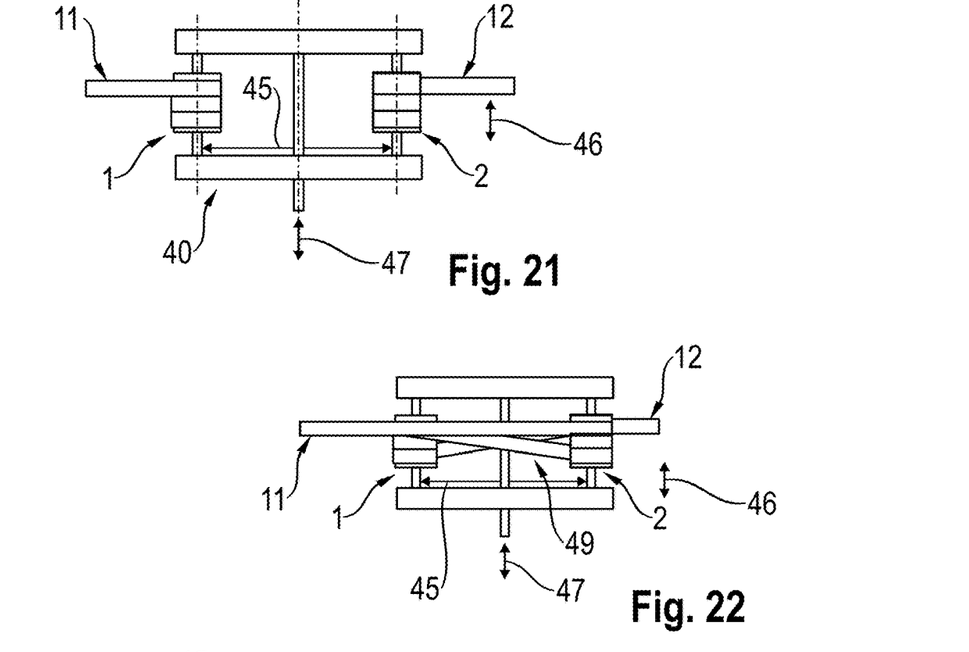

In FIG. 20, the fiber-reinforced plastics bands 11, 12 are relatively wide. In FIG. 21, it is shown that the fiber-reinforced plastics bands 11, 12 can also be narrower.

A double arrow 46 in FIG. 21 shows that a roll with the fiber-reinforced plastics band 12 can also be displaceable upwards and downwards in FIG. 21 in order to facilitate wrapping of the narrower fiber-reinforced plastics band 12 around the inner element 2.

An arrow 47 in FIG. 21 shows that the entire coupling support 17 of the apparatus 40 can also be displaceable in order to facilitate the deposition of the plastics bands 11, 12.

FIG. 22 shows that the fiber-reinforced plastics bands 11, 12 can also be deposited between the inner elements 1, 2 in a crossed association or crossed formation 49. The deposition of the plastics bands 11, 12 in a crossed association 49 is facilitated by the displaceability 46, 47.

The double arrow 45 in FIGS. 20 to 23 is additionally intended to illustrate that fiber composite components of different lengths can also be produced in a simple manner with the apparatus 40. The apparatus 40 provides an inexpensive system concept which manages without an additional tool and without conversion. The production costs can thus effectively be reduced. In addition, a high degree of variability in the production of the fiber composite components is made possible.

Figure 23:
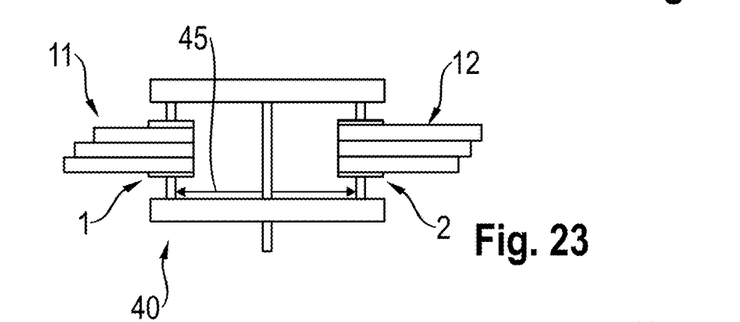

FIG. 23 shows that it is also possible to use multiple reels for wrapping with the fiber-reinforced plastics bands 11, 12.

Figure 24:
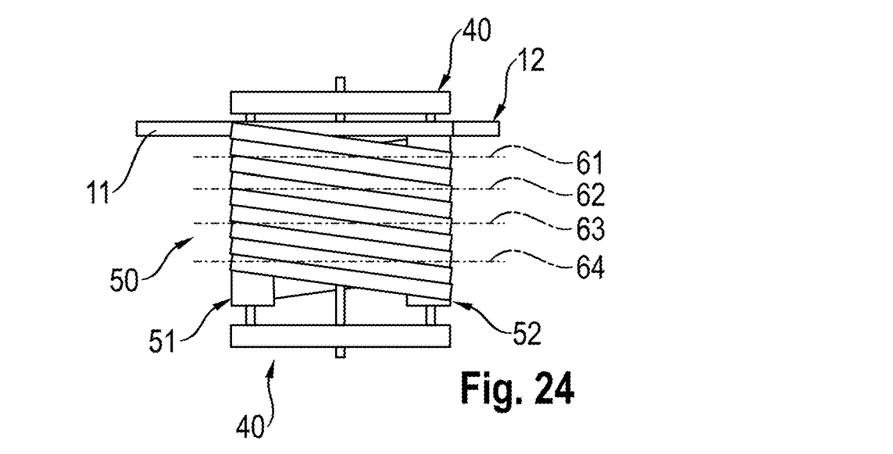

FIG. 24 shows that oversized inner elements 51, 52 can also be used in the tool 40, around which inner elements the fiber-reinforced plastics bands 11, 12 are wrapped, for example in a crossed association. This results in an oversized fiber composite component 50, which is subsequently divided into multiple smaller fiber composite components, as is indicated by broken lines 61 to 64.

What is claimed is:

1. A method for producing a fiber composite component including (i) two inner elements arranged at a distance from one another, (ii) a first fiber-reinforced plastics band wrapped around a first inner element of said two inner elements, and (iii) a second fiber-reinforced plastics band wrapped around a second inner element of said two inner elements, wherein the inner elements each have a rotationally symmetrical form and an axis of rotation, said method comprising:
(a) rotating the first inner element about its axis of rotation using a first rotary drive coupled to the first inner element in order to wrap the first fiber-reinforced plastics band around the first inner element;
(b) rotating the second inner element about its axis of rotation using a second rotary drive coupled to the second inner element in order to wrap the second fiber-reinforced plastics band around the second inner element, wherein the second rotary drive rotates independently of the first rotary drive;
(c) arranging an intermediate element between the inner elements;
(d) using a tensioning device to move the first and second fiber-reinforced plastics against the intermediate element, wherein the tensioning device comprises two pressing rollers that are positioned on opposing sides of the intermediate element; and
(e) jointly rotating the intermediate element and the first and the second inner elements about a third axis of rotation using a third rotary drive in order to wrap the first and the second fiber-reinforced plastics band alternately around the first and the second inner elements and the intermediate element in such a manner that the distance between the inner elements is bridged by the first and the second fiber-reinforced plastics band.

2. The method as claimed in claim 1, wherein the fiber-reinforced plastics bands are deposited parallel to one another between the inner elements.

3. The method as claimed in claim 1, wherein a fiber composite component in an axial direction is divided, after wrapping, transversely to the axial direction into at least two fiber composite components.

4. The method as claimed in claim 1, wherein each fiber-reinforced plastics band is wrapped at least partially around both of the inner elements.

5. The method as claimed in claim 1, wherein the intermediate element is a pultruded profile.

6. The method as claimed in claim 1, wherein the intermediate element has concave side surfaces each of which faces one of the inner elements.

7. The method as claimed in claim 1, further comprising the step of heat treating the fiber composite component.

8. The method as claimed in claim 1, wherein the third rotary drive rotates independently of the first and second rotary drives.

9. The method as claimed in claim 1, wherein step (e) follows steps (a) through (d).

10. The method as claimed in claim 1, wherein rotation in steps (a), (b) and (e) is in the same rotational direction.

11. The method as claimed in claim 1, wherein the intermediate element has a waisted shape.

* * * * *